United States Patent [19]

Kurakazu et al.

[11] Patent Number: 4,825,355

[45] Date of Patent: Apr. 25, 1989

[54] INSTRUCTION FORMAT FOR PROGRAM CONTROL TYPE DATA PROCESSING SYSTEMS

[75] Inventors: Keiichi Kurakazu, Tachikawa; Shiro Baba, Tokorozawa, both of Japan

[73] Assignee: Hitachi, Ltd., Tokyo, Japan

[21] Appl. No.: 899,389

[22] Filed: Aug. 22, 1986

[30] Foreign Application Priority Data

Oct. 25, 1985 [JP] Japan .................. 60-237359

[51] Int. Cl.⁴ .................. G06F 9/22; G06F 9/30
[52] U.S. Cl. .................. 364/200
[58] Field of Search .................. 364/200, 900

[56] References Cited

U.S. PATENT DOCUMENTS

| | | | |
|---|---|---|---|
| 4,307,445 | 12/1981 | Tredennick et al. | 364/200 |
| 4,314,332 | 2/1982 | Shiraogawa et al. | 364/200 |
| 4,325,121 | 4/1982 | Gunter et al. | 364/200 |
| 4,342,078 | 7/1982 | Tredennick et al. | 364/200 |
| 4,363,091 | 12/1982 | Pohlman, III et al. | 364/200 |
| 4,388,682 | 6/1983 | Eldridge | 364/200 |
| 4,466,056 | 8/1984 | Tanahashi | 364/200 |
| 4,471,433 | 9/1984 | Matsumoto et al. | 364/200 |
| 4,506,345 | 3/1985 | Boothroyd et al. | 364/900 |
| 4,583,199 | 4/1986 | Boothroyd et al. | 364/900 |
| 4,586,130 | 4/1986 | Butts, Jr. et al. | 364/200 |
| 4,616,313 | 10/1986 | Aoyagi | 364/200 |

*Primary Examiner*—Gareth D. Shaw
*Assistant Examiner*—Adolfo Ruiz
*Attorney, Agent, or Firm*—Antonelli, Terry & Wands

[57] ABSTRACT

An instruction having two operands includes a field specifying the bit length of a source operand and a field specifying the bit length of data to be operated upon by the execution unit. Based on size information stored in these fields, the operand bit length is modified, which avoids need for modification of the bit length of an operand by use of a macro instruction at the time of execution of an operation based on the two operands. Consequently, the program execution speed can be improved.

8 Claims, 3 Drawing Sheets

| OP | Sz1 | EAd | Sz2 | EAs |
|---|---|---|---|---|

FIG. 1A

| OP | Sz1 | EAs | Sz2 | EAd |
|---|---|---|---|---|

FIG. 1B

| OP | Sz1 | EAd | EXTENSION FIELD | Sz2 | EAs | EXTENSION FIELD |
|---|---|---|---|---|---|---|

FIG. 1C

| OPERATION CODE (OP) | SIZE (Sz) | REGISTER DESIGNATION (SOURCE) (Dn) | EFFECTIVE ADDRESS (DESTINATION) (EA2) |
|---|---|---|---|

FIG. 2

INSTRUCTION FORMAT FOR PROGRAM CONTROL TYPE DATA PROCESSING SYSTEMS

BACKGROUND OF THE INVENTION

The present invention relates to a data processing technique, and in particular, to a technique especially effective when applied to an instruction format in a system of a program control type, for example, to a technique effectively applicable to a configuration method of a two-operand instruction using two operands at execution of an instruction.

Conventionally, a set of microinstructions of the microprocessors such as HD68000 produced by Hitachi Ltd. is classified into three kinds of instruction formats: (1) no-operand instruction (for which no operand is required), (2) one-operand instruction, and (3) 2-operand instruction.

FIG. 2 is a schematic diagram illustrating the configuration of the 2-operand instruction.

Namely, a 2-operand instruction comprises an operation code field OP, a size field Sz specifying the operand size (bit length such as 8, 16, or 32 bits), source side operand Dn, and an effective address field EA2 indicating the operand location on the destination side. (Refer to "Hitachi Microcomputer, Semiconductor Data Book, 8/16 Bit Microcomputer", pp. 945–952; Hitachi, Ltd.; Sep. 1982.) As described above, the two-operand instruction of the conventional microprocessors of the HD6800 family has only one size field Sz. In this case, for example, an addition instruction specified in mnemonic codes as ADD Do, x cannot be executed if the source operand Do and the destination operand x are not of the same bit length. Consequently, to execute the ADD operation with the size of the source operand Do set to 8 bits and with the size of the destination operand x set to 32 bits, an adjusting instruction is required to preliminarily adjust the size of the source operand Do from 8 bits to 32 bits. Namely, an instruction which adds three bytes of "0" to the 8-bit operand as the first portion thereof must be executed before the ADD operation is implemented.

As a result, the number of steps of a macro program is increased. In addition, to store an operand (in a case of the 8-bit length) for which only one byte is required, a memory area equivalent to two words becomes necessary. Consequently, the execution speed of a program is lowered depending on the instruction format; moreover, we have found that the memory utilization ratio is also deteriorated.

SUMMARY OF THE INVENTION

It is therefore an object of the present invention to provide an instruction format which is capable of improving the execution speed of a program in a system of the program control type.

Another object of the present invention is to provide an instruction format which is capable of improving the memory utilization ratio in a system of the program control type.

According to the present invention, in an instruction having two operands, an operation word includes a field specifying the size of the source operand and a field specifying the size of the operation so as to change the operand bit length based on the size information; consequently, the bit length of an operand need not be changed by use of a macro instruction. The program execution speed is therefore increased. Furthermore, two operands can be respectively stored in a memory or a register with their original bit lengths, and so the memory utilization ratio is improved.

BRIEF DESCRIPTION OF THE DRAWINGS

The present invention will be apparent from the following detailed description taken in conjunction with the accompanying drawings in which:

FIGS. 1A–1C are explanatory diagrams illustrating examples of the two-operand instruction according to the present invention;

FIG. 2 is a schematic diagram depicting the format of a two-operand instruction in the conventional microprocessor;

DESCRIPTION OF THE PREFERRED EMBODIMENTS

Referring to FIGS. 1A–1C, there are shown examples of the format of the new two-operand instruction proposed by the present invention.

As shown in FIG. 1A, an operation code field OP is followed by an operation size field $Sz_1$ specifying the size of the operation, namely, the bit length used to execute the instruction, such as an operation. The size field $Sz_1$ is followed by an effective address field EAd specifying the location of the destination operand. The effective address field EAd is further followed by a source size field $Sz_2$, which is followed by an effective address field EAs indicating the location of the source operand.

The effective address fields EAd and EAs each comprise, for example, three addressing mode bits specifying an addressing mode and four register designation bits designating a register.

In the instruction format, the size field $Sz_1$ is so configured not to specify the size of the destination operand but to specify the operation size, namely, the length of data to be subjected to the operation for the following reasons. That is, the problem associated with an operation execution is the length of the data on which the operation is conducted. For example, data items having different bit lengths cannot be subjected to an addition or a subtraction operation in an arithmetic logic unit (ALU) or the like. Ordinarily, the operation size is identical to the size of the destination operand; consequently, if the operation size is specified, the operation in the ALU or the like can be executed without any trouble. In addition to $Sz_1$, if a field for specifying the size of the destination operand is allocated, this field may be used to store only a portion of data after the processing of the operation is completed.

In a 16-bit microprocessor, since it is only necessary to be capable of discriminating whether the size of the operation and the size of the source operand is represented with a byte length (8 bits) or a word length (16 bits), the size fields $Sz_1$ and $Sz_2$ of FIG. 1A each need only be configured with two bits.

The fields of the two-operand instruction according to the present invention is not restricted by those shown in FIG. 1A, but each field may be arranged in an arbitrary configuration. For example, as shown in FIG. 1B, the operation size field $Sz_1$ may be followed by the source operand effective address field EAs and the destination operand effective address field EAd.

In addition, depending on the addressing mode, extension fields are required to be added to the effective address fields EAd and EAs. In this case, the format of the two-operand instruction is configured as shown in FIG. 1C. The extension field includes, depending on the addressing mode, a 1–4 byte displacement d (offset value), a 1–4 byte immediate data #, a 1–4 byte absolute address @, or an index register byte x.

Figure 3:
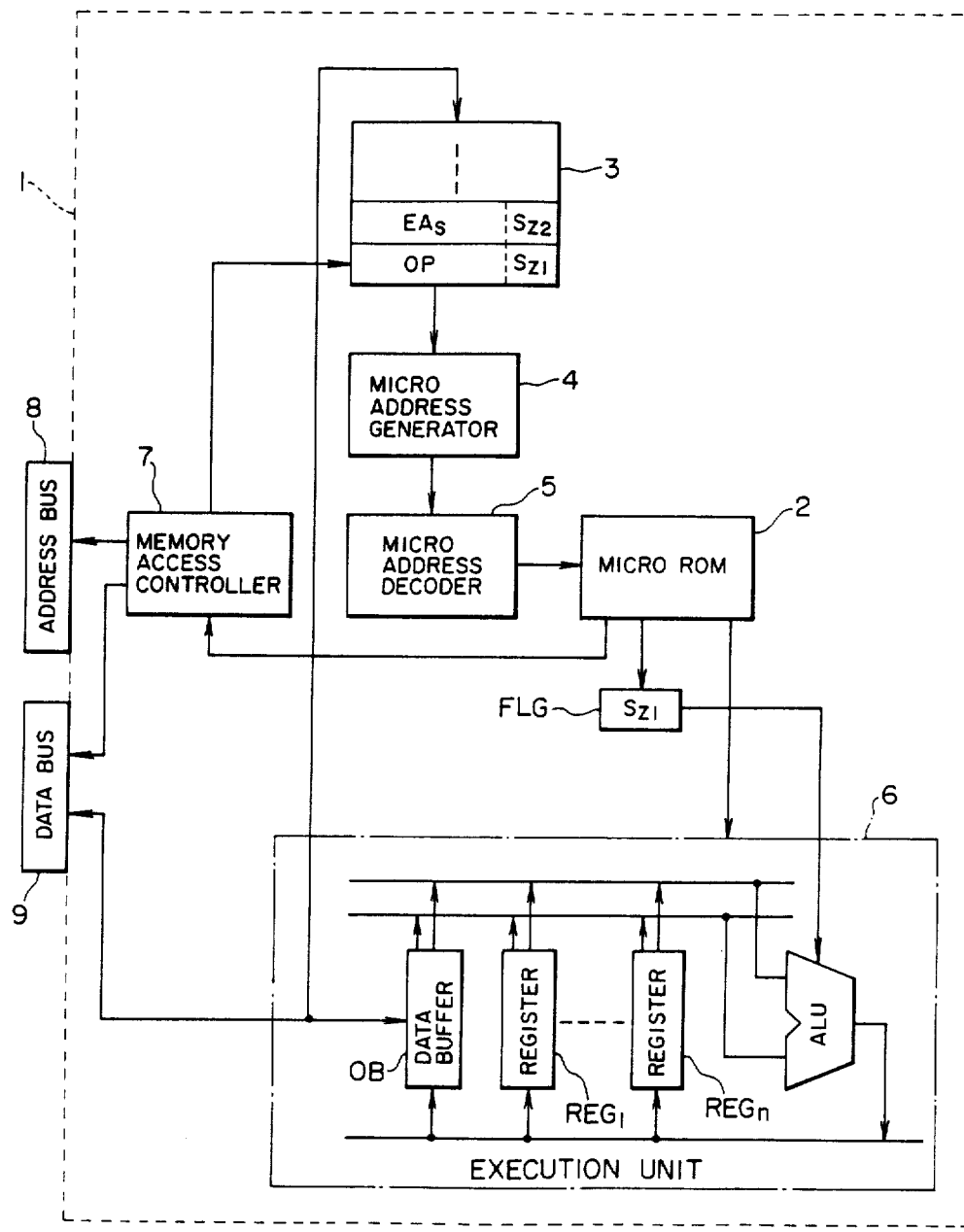
FIG. 3 is a block diagram showing a configuration example of a microprocessor enabling to execute a two-operand instruction according to the present invention.

Referring now to FIG. 3, a description will be given of an example of the hardware configuration of a microprocessor which makes it possible to the two-operand instruction in the format described above.

The microprocessor of this embodiment includes a controller of the microprogram control type. Namely, an LSI chip 1 constituting the microprocessor comprises a micro ROM (read-only memory) in which microprograms are stored. A micro ROM 2 is accessed from a micro address decoder 5 and sequentially outputs microinstructions constituting the microprograms.

A micro address generator 4 generates an address to be supplied to the micro address decoder 5 based on the operation code of the macro instruction fetched into an instruction register 3. The micro address decoder 5 then decodes the address. In response to the decode operation, the first instruction of a sequence of microinstructions for the macro instruction is read from the micro ROM 2. According to the microinstruction code, control signals are formed for an execution unit 6 comprising various temporary registers $REG_1$ to $REG_n$, a data buffer DB, and an ALU.

Among the micro instructions corresponding to the macro instruction, the second and subsequent microinstructions are executed when the code of the next address field of the microinstruction previously read is supplied to the micro address decoder 5, for example. That is, based on the next address in the previous microinstruction and the address supplied from the micro address generator 4, the second or subsequent microinstruction is read out. A series of microinstructions are thus read out and the execution unit 6 is controlled by the control signals formed as described above, thereby executing a macro instruction such as ADD.

In this example, but not limited to, there is provided a memory access controller 7 having a function to read data from or to write data in an external memory, an internal register, or the like in byte, word, or long word units when required.

The instruction register 3 is constituted from, but not limited to, a first-in first-out (FIFO) memory. A macro instruction stored in an external memory is read in byte units when the memory access controller 7 accesses an address bus 8, and the data is supplied via a data bus 9 to the FIFO memory 3. A plurality of operation codes and operands are thus fetched into the FIFO memory 3 in advance.

If a macro instruction fetched into the FIFO memory 3 is a two-operand instruction as shown in FIG. 1A, a corresponding microinstruction is read out from the micro ROM 2 according to the operation code OP and the content of the operation size field $Sz_1$ in the first eight bits. The microinstruction causes the flag FLG of the flag memory $Sz_1$ of FIG. 3 to be set to an appropriate value. Depending on the status of the flag FLG, the ALU in the execution unit 6 is instructed to effect an operation with 8, 16, or 32 bits. Subsequently, when the FIFO memory 3 supplies the source operand effective address EAs and the source operand size code $Sz_2$ to the micro address generator 4, a corresponding microinstruction is read from the micro ROM 2 and a part thereof is fed to the memory access controller 7. This causes the memory access controller 7 to read a source operand (from an external memory, an internal register, or the like) beginning from the address indicated by the effective address EAs in the byte, word, or long word units according to the operand size $Sz_2$. The obtained source operand is fetched into a data buffer DB, and then the source size of the operand is converted into the specified operation size $Sz_1$ by an appropriate circuit, which provides a required number of zeros at the output of the data buffer in a conventional manner, and is supplied to the ALU. Consequently, an instruction for adjusting the size need not be separately provided. In a case of an instruction of (EAs)⊕(EAd)→(EAd), a code indicating the effective address EAd of the destination operand is supplied to the micro address generator 4 after the source operand so as to read a corresponding microinstruction. Depending on the size information held in the flag FLG, the memory access controller 7 in turn reads a destination operand with the same size as the operation size beginning from the position indicated by the effective address EAd and delivers destination operand to the ALU. When the operation is completely processed by the ALU, the operation data is stored in the position of the destination operand, thereby completing the execution of the macro instruction.

Figure 4:
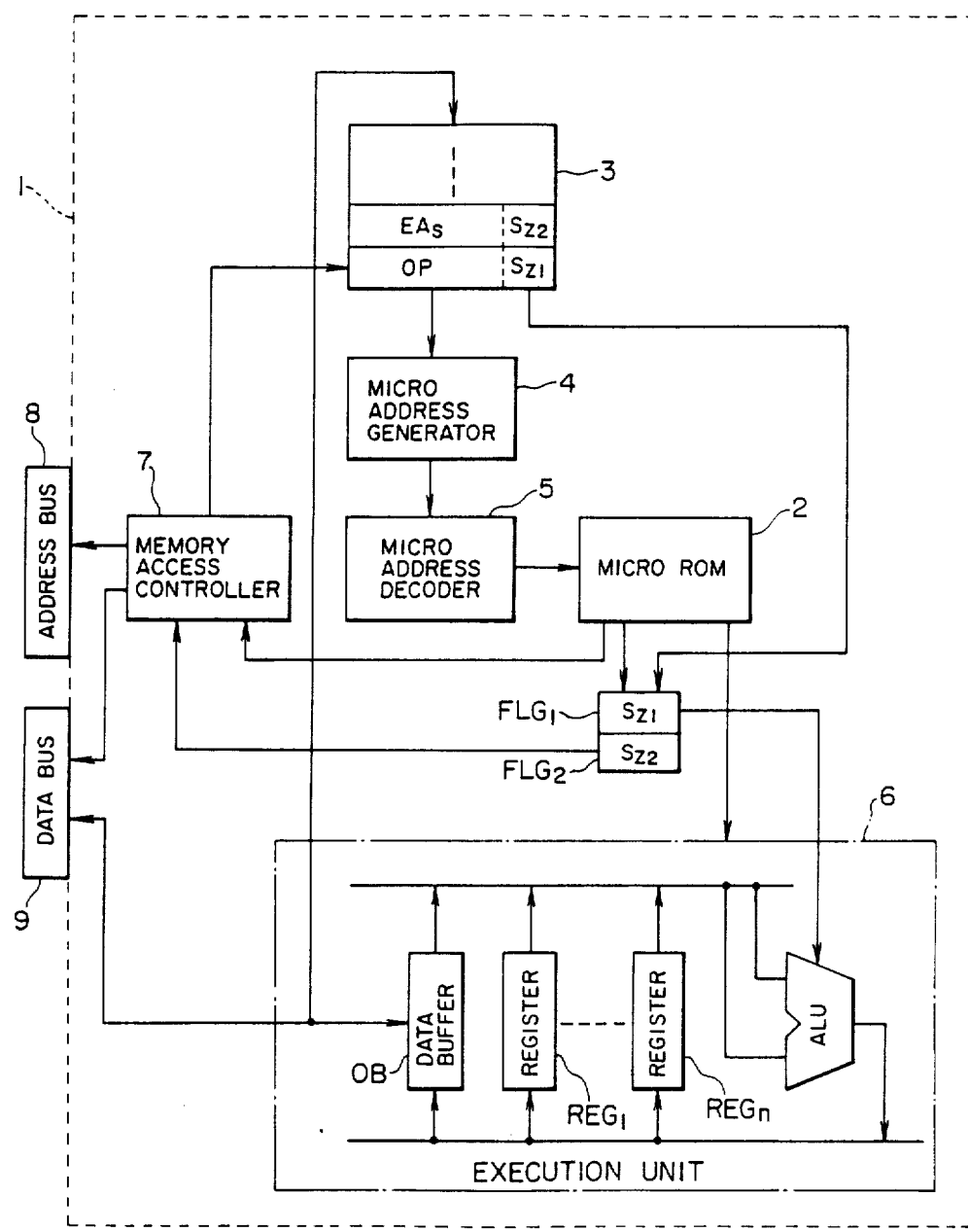
FIG. 4 is a schematic block diagram illustrating another configuration example of a microprocessor enabling to execute the two-operand instruction according to the present invention.

Referring next to FIG. 4 a description will be given of another example of hardware which makes it possible to execute the two-operand instruction configured according to the instruction format of the present invention. Since the basic configuration of the microprocessor of this embodiment is substantially identical to that of the system shown in FIG. 3, the same reference numerals are assigned to the circuits having the same functions and hence the description thereabout will be omitted.

In the microprocessor of FIG. 3, the codes of operand size fields $Sz_1$ and $Sz_2$ are supplied to the micro address generator 4 so as to be used to generate a micro address of the micro ROM 2. A microinstruction is read by use of the micro address and information about the operation size $Sz_1$ is supplied to the flag FLG by the microinstruction.

In contrast, the microprocessor of FIG. 4 is provided with two flags $FLG_1$ and $FLG_2$ for keeping the codes directly moved from the size fields $Sz_1$ and $Sz_2$ of the microinstruction fetched into the FIFO memory 3. The ALU and the like in the execution unit 6 are so controlled according to the information about the operation size $Sz_1$ held in the flag $FLG_1$ to effect an operation in byte, word, or long word units.

On the other hand, based on the information about the source operand size stored in the second flag $FLG_2$, the memory access controller 7 reads an operand from an external memory, an internal register, or the like in byte, word, or long word units and latches the operand into the data buffer DB. The operand latched into the data buffer DB is modified according to the operation size indicated by the first flag $FLG_1$ and the resultant data is supplied to the ALU and the like. The subsequent operations are the same as those of the microprocessor of FIG. 3.

Although the microprocessor of the configuration of FIG. 4 requires an additional 2-bit flag as compared with the microprocessor of FIG. 3, the operand size information is directly incorporated in the flag, which leads to an advantage to facilitate the microprogram. Only the operation size $Sz_1$ or $Sz_2$ may be stored directly in the flag.

As described above, the format configuration of the two-operand instruction includes a field specifying the operation size in addition to the field specifying the source operand size as shown in the embodiment, which avoid need for such a change required for the two-operand instruction in the conventional format as to modify the bit length of the source operand to be equal to that of the destination operand in advance. Namely, an operand with 8- or 16-bit length can be stored in a memory or the like in the original form so as to be read out later. For the operand read out, the bit length is automatically changed to be a desired bit length in the execution unit and the resultant data is used for the operation.

As a result, the macro instruction to modify the operand length becomes unnecessary and hence the program execution speed is increased. In addition to the fact that such a macro instruction is unnecessary, an operand having a short length can be stored in the memory in its original form; consequently, the memory utilization ratio is improved.

Although the embodiment has been described in conjunction with a case where a two-operand instruction such as (EAs)⊕(EAd)→(EAd) is executed, it is also possible to execute an instruction having two source operands and one destination operand such as (EAs$_1$)-⊕(EAs$_2$)→(EAd).

Although the present invention has been described with reference to specific embodiments, the present invention is not restricted by the embodiments. It should be appreciated that those skilled in the art can change or modify the embodiments without departing from the scope and the spirit of the present invention. For example, in the embodiments, the two-operand instruction includes a source operand size field and an operation size field; however, in a system in which the destination operand size is always identical to the operation size, the destination operand size field may be assigned in place of the operation size field.

The present invention has been described in conjunction with an application to a particular utilization field, namely, a microprocessor which is the background of the invention, the present invention is not restricted by this example but it can be generally applied to data processing systems of the program control type, such as a computer and a mini-computer.

What is claimed is:

1. A data processing system comprising:
   an instruction register in which a macro instruction is stored;
   a micro ROM for outputting a microinstruction according to a macro instruction outputted from said instruction register;
   an execution unit for effecting an operation according to the microinstruction, wherein said macro instruction includes:
   (a) a field for designating an operation code indicating an operation to be performed by said execution unit on at least two operands;
   (b) a first address designation field for specifying an address of a first operand;
   (c) a second address designation field for specifying an address of a second operand;
   (d) a first bit length designation field for specifying a first bit length of data to be operated on by said execution unit; and
   (e) a second bit length designation field for specifying a second bit length of said first operand, said first bit length being different from said second bit length;
   a memory access control circuit including means responsive to a code in said second bit length designation field for reading an operand of specified bit length from a memory;
   first store means in which predetermined information is stored by a microinstruction read according to a code in said first bit length designation field for controlling said execution unit; and
   second store means in which a code in said second bit length designation field is stored for controlling said memory access control circuit.

2. A data processing system according to claim 1 wherein said memory access control circuit includes means responsive to a microinstruction read according to a code in said second bit length designation field for reading an operand of specified bit length from said memory.

3. A data processing system according to claim 1 or 2 wherein said execution unit includes means for changing the bit length of the first operand read by said memory access control circuit according to a code in said first bit length designation field and for thereafter effecting an operation on said first operand and said second operand.

4. A data processing system comprising an execution unit for effecting an operation according to an instruction, wherein the instruction includes:
   (a) information for designating an operation code indicating an operation to be performed by said execution unit on at least two operands;
   (b) first address designation information for specifying an address of a first operand;
   (c) second address designation information for specifying an address of a second operand;
   (d) first bit length designation information for specifying a first bit length of data to be operated by said execution unit; and
   (e) second bit length designation information for specifying a second bit length of said first operand, said first bit length being different from said second bit length;
   and wherein said data processing system further comprises:
   a memory access control circuit including means responsive to a code in said second bit length designation field for reading an operand of specified bit length from a memory;
   first store means in which predetermined information is stored by a microinstruction read according to a code in said first bit length designation field for controlling said execution unit; and
   second store means in which a code in said second bit length designation field is stored for controlling said memory access control circuit.

5. A data processing system according to claim 4 wherein said execution unit includes means for changing the bit length of the first operand read by said memory access control circuit according to said first bit length designation information and for thereafter effecting an operation based on said first operand and said second operand.

6. A method of controlling processing in a microprocessor having an arithmetic logic means for effecting an operation on operands supplied thereto and memory access means for reading data from a storage device in response to an instruction having an operation code, first and second operand address information and first and second size information, comprising the steps of:
  (a) reading a first operand from said storage device by means of said memory access means in response to the first operand address information and the first size information of said instruction;
  (b) changing the bit length of said first operand in response to the second size information of said instruction;
  (c) reading a second operand from said storage device by means of said memory access means in response to the second operand address information and the second size information of said instruction; and
  (d) effecting an operation of said arithmetic logic means on said first operand and said second operand in response to said second size information of said instruction.

7. A method according to claim 6, wherein said step (d) includes:
  (d1) controlling said arithmetic logic means to operate on data of specified size in response to said second size information of said instruction.

8. A method of controlling processing in a microprocessor having an arithmetic logic means for effecting an operation on operands supplied thereto and memory access means for reading data from or writing data in a memory means in response to an instruction indicating an operation to be performed by said arithmetic logic means on at least two operands and having first and second operand address information and first and second size information, comprising the steps of:
  (a) reading a first operand from said memory means by means of said memory access means in response to the first operand address information and the first size information of said instruction;
  (b) changing the bit length of said first operand in response to the second size information of said instruction;
  (c) reading a second operand from said memory means by means of said memory access means in response to the second operand address information and the second size information of said instruction;
  (d) effecting an operation of said arithmetic logic means on said first operand and said second operand for a bit length of data specified by said second size information of said instruction; and
  (e) writing output data of said arithmetic logic means into said memory means in response to said second operand address information of said instruction.

* * * * *